Dec. 6, 1949      R. A. WORK      2,490,185

ILLUMINATED GLOBE

Filed March 18, 1947

INVENTOR.
RALPH A. WORK
BY *Zoltan A. Polacsek*
ATTORNEY

Patented Dec. 6, 1949

2,490,185

UNITED STATES PATENT OFFICE 2,490,185

ILLUMINATED GLOBE

Ralph A. Work, Brooklyn, N. Y.

Application March 18, 1947, Serial No. 735,446

6 Claims. (Cl. 240—2)

1

The present invention relates to terrestrial globes and more particularly to globes of this character which are adapted for internal illumination.

An object of the invention is to provide a globe of this character constructed of suitable translucent material and carrying on its external surface a graphical representation of the geographical contours of the earth.

A further object of the invention is to provide such a globe which may be internally illuminated without the use of direct electrical connections.

A further object of the invention is to provide a globe of this character in which approximately one-half of the surface will be illuminated and the other half relatively darkened, the illuminated area corresponding generally to that portion of the earth's surface which would be illuminated at any particular time of day by light from the sun.

Another object of the invention consists in providing means whereby the globe may be rotated to bring various portions of its area into the field of illumination while other portions of its area be correspondingly brought into the region of darkness. This provision permits a study of the time relationship between different geographical locations on the earth's surface.

From another aspect, the invention contemplates that an indirectly energized source of illumination shall be mounted within the globe arranged for free rotation about an axis corresponding substantially with the axis of the earth as pictured on the surface of the globe. The invention also contemplates the use of a weight or some equivalent means for maintaining the internal source of illumination in relatively fixed position with respect to the observer as the globe is rotated into various positions.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
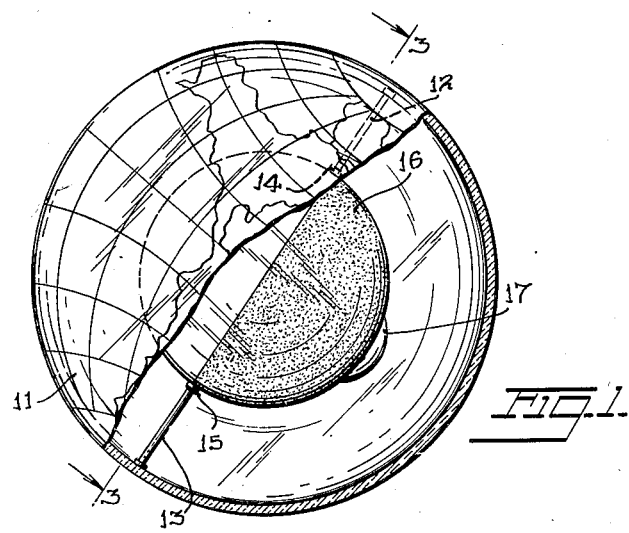
Fig. 1 shows a view of the globe in elevation, partly broken away.
Figure 2:
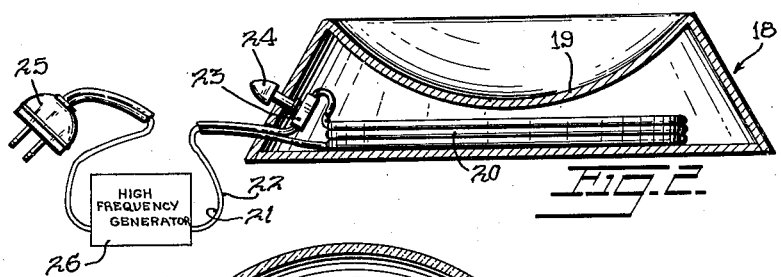
Fig. 2 shows a sectional view of a stand for supporting the globe.
Figure 3:
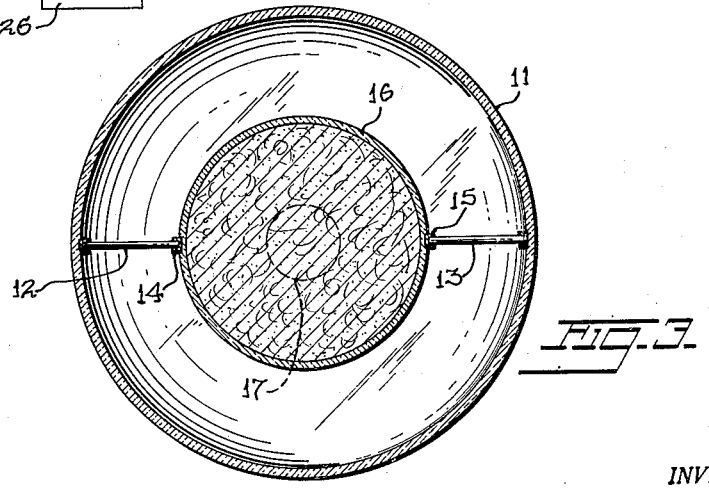
Fig. 3 shows a sectional view of the globe taken along the line 3—3 of Fig. 1.

Referring to Fig. 1, a globe 11 constructed of suitable translucent material carries on its ex-

2 ternal surface a geographical representation of the world. This geographical representation may also be applied to the internal surface of the globe, if desired, depending upon the nature of the translucent material of which the globe is constructed. If desired, the globe may be made of transparent material and carry on its inner surface the geographical representation together with a translucent coating. A pair of supporting members 12 and 13 are secured at their outer extremities to the internal surface of the globe. Supporting members 12 and 13 extend inwardly substantially along an axis of the earth as determined by the geographical representation imprinted on the globe. At their innermost extremities, members 12 and 13 engage bearings 14 and 15 respectively which are secured to a source of illumination 16.

Source 16 may be constructed of any suitable material, such as glass, and is preferably spherical in shape as indicated. The bearings 14 and 15 provide for free rotation of source 16 and are preferably located at opposite ends of a diameter of source 16. However, these bearings are preferably so positioned that source 16 will be substantially concentric with globe 11.

Substantially one half the surface of source 16 is darkened or is rendered opaque, this darkened surface lying below and being bounded by a great circle passing through the bearings 14 and 15. Secured to the darkened portion of the source 16 is a weight 17 which will always bring the darkened portions into a relatively downward position regardless of the position to which globe 11 may be rotated.

The interior of source 16 is filled with a gas such as helium, neon, or argon, at suitable pressure, or with mercury vapor or any other substance which will emit light when energized by a suitable electric field. If desired, the unshaded portion of source 16 may be coated with a suitable fluorescent material which will increase the output of illumination in cases where the gas or vapor within the interior of the source emits sufficient radiation in the ultra-violet portion of the spectrum.

A base member 18 of electrically insulating material, is provided with a partial circular recess 19 having a radius of curvature substantially equal to the radius of curvature of globe 11. Disposed beneath the recess 19 is an electrical coil 20 adapted for energization by conductors 21 and 22. A regulating device 23, which may also comprise a switch, is mounted within the base 18 and is provided with an external knob 24 permitting control of the energization of coil 20. Energization of coil 20 is effected by plug 25 which is adapted for insertion in the usual power supply outlet.

In order to obtain a more effective degree of energization of coil 20, it may be desirable to include in the energization circuit thereof a suitable source of high frequency current adapted to be energized by plug 25. In some instances it may be possible to omit high frequency source 26 completely, and to energize coil 20 directly from plug 25. Whether or not high frequency source 26 may be omitted, will depend upon the characteristics of coil 20 and upon the sensitivity characteristics of the source of illumination 16 within the globe.

In operation, globe 11 rests within the recess 19 of base 18. Coil 20 is energized to a suitable extent and at a suitable frequency so that it will produce an electro-magnetic field extending into the interior of globe 11 which will activate light source 16. The degree of illumination can be controlled by adjustment of knob 24. Where high frequency generator 26 is used, it may be preferable to include the adjustment of illumination intensity as a part of the facilities associated with the high frequency generator.

It is contemplated that the field produced by coil 20 shall extend in the immediate vicinity of the base 18 and a sufficient distance therefrom permitting the globe 11 to be removed from the base 18 and to be rotated while still maintaining effective illumination of the source 16. The distance the globe 11 may be removed from the base 18 and still maintain effective illumination, will depend upon the configuration of the field strength pattern produced by coil 20 and it will likewise depend upon the sensitivity and illumination response characteristics of the source 16. By suitable selection and design, it will be possible to maintain a sufficient degree of illumination from source 16 as the globe 11 is manipulated within a reasonable distance of stand 18.

Moreover, by reason of the action of weight 17, the darkened half of source 16 will always be maintained in a relatively downward position as the globe is rotated. In this way one half of the surface of globe 11 will be illuminated and the other half will be maintained in its relatively darkened condition. The effect thus obtained simulates the illumination of the earth by the sun.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an illuminated globe having a hollow base formed with a partial circular recess in which a hollow translucent globe of the earth rests, a gas filled transparent ball disposed within the globe, means within the base for creating an electro-magnetic field of sufficient scope to encompass the globe and ignite said gas filled ball, said ball having one-half rendered opaque so as to illuminate only one-half the globe, means rotatively supporting said ball concentrically within said globe to rotate relative thereto, and means weighting the opaque half of said ball to retain the ball stationary while the globe is rotated to change the half thereof which will be illuminated by said ball.

2. In an illuminated globe having a hollow base formed with a partial circular recess in which a hollow translucent globe of the earth rests, a gas filled transparent ball disposed within the globe, means within the base for creating an electro-magnetic field of sufficient scope to encompass the globe and ignite said gas filled ball, said ball having one-half rendered opaque so as to illuminate only one-half the globe, means rotatively supporting said ball concentrically within said globe to rotate relative thereto, and means weighting the opaque half of said ball to retain the ball stationary while the globe is rotated to change the half thereof which will be illuminated by said ball, said rotative supporting means comprising bearings mounted on diametrically opposite sides of said ball, and a pair of support members having their inner ends engaged in said bearings and extended radially therefrom and having their outer ends attached to the inside faces of said globe.

3. In an illuminated globe having a hollow base formed with a partial circular recess in which a hollow translucent globe of the earth rests, a gas filled transparent ball disposed within the globe, means within the base for creating an electro-magnetic field of sufficient scope to encompass the globe and ignite said gas filled ball, said ball having one-half rendered opaque so as to illuminate only one-half the globe, means rotatively supporting said ball concentrically within said globe to rotate relative thereto, and means weighting the opaque half of said ball to retain the ball stationary while the globe is rotated to change the half thereof which will be illuminated by said ball, said rotative supporting means comprising bearings mounted on diametrically opposite sides of said ball, and a pair of support members having their inner ends engaged in said bearings and extended radially therefrom and having their outer ends attached to the inside faces of said globe, said bearings being mounted on said ball at points between said transparent and opaque areas.

4. In an illuminated globe having a hollow base formed with a partial circular recess in which a hollow translucent globe of the earth rests, a gas filled transparent ball disposed within the globe, means within the base for creating an electro-magnetic field of sufficient scope to encompass the globe and ignite said gas filled ball, said ball having one-half rendered opaque so as to illuminate only one-half the globe, means rotatively supporting said ball concentrically within said globe to rotate relative thereto, and means weighting the opaque half of said ball to retain the ball stationary while the globe is rotated to change the half thereof which will be illuminated by said ball, said rotative supporting means comprising bearings mounted on diametrically opposite sides of said ball, and a pair of support members having their inner ends engaged in said bearings and extended radially therefrom and having their outer ends attached to the inside faces of said globe, said support members being in axial alignment and extended along the imaginary axis of the earth as determined by the representation of the earth on the globe's surface.

5. In an illuminated globe having a hollow base formed with a partial circular recess in which a hollow translucent globe of the earth rests, a gas filled transparent ball disposed within the globe, means within the base for creating an electro-magnetic field of sufficient scope to encompass the globe and ignite said gas filled ball, said ball having one-half rendered opaque so as to illuminate only one-half the globe, means rotatively supporting said ball concentrically within said globe to rotate relative thereto, and means weighting the opaque half of said ball to retain the ball stationary while the globe is rotated to change the half thereof which will be illuminated by said ball, said weighting means comprising a weight secured to the opaque area of said globe.

6. In an illuminated globe having a hollow base formed with a partial circular recess in which a hollow translucent globe of the earth rests, a gas filled transparent ball disposed within the globe, means within the base for creating an electro-magnetic field of sufficient scope to encompass the globe and ignite said gas filled ball, said ball having one-half rendered opaque so as to illuminate only one-half the globe, means rotatively supporting said ball concentrically within said globe to rotate relative thereto, and means weighting the opaque half of said ball to retain the ball stationary while the globe is rotated to change the half thereof which will be illuminated by said ball, said rotative supporting means comprising bearings mounted on diametrically opposite sides of said ball, and a pair of support members having their inner ends engaged in said bearings and extended radially therefrom and having their outer ends attached to the inside faces of said globe, said weighting means comprising a weight secured to the opaque area of said globe midway between said bearings.

RALPH A. WORK.

REFERENCES CITED

The following references are of record in the file of this patent:

UNITED STATES PATENTS

| Number | Name | Date |
| --- | --- | --- |
| 336,280 | Bailey | Feb. 16, 1886 |
| 876,739 | Siever et al. | Jan. 14, 1908 |
| 1,515,135 | Alexander | Nov. 11, 1924 |
| 1,610,108 | Patton | Dec. 7, 1926 |
| 2,121,460 | Waters | June 21, 1938 |
| 2,181,889 | Hanson | Dec. 5, 1939 |
| 2,345,800 | Dupler | Apr. 4, 1944 |